US012181130B1

(12) United States Patent
Krotmeier et al.

(10) Patent No.: US 12,181,130 B1
(45) Date of Patent: Dec. 31, 2024

(54) LIGHT LEAK SHIELD FOR INSERTING INTO A LINEAR LUMINAIRE INCLUDING A LIGHT INSET INSERTED IN A LINEAR CHANNEL

(71) Applicant: Diem GmbH, Graz (AT)

(72) Inventors: Stefan Krotmeier, New York, NY (US); Moritz Gessner, Graz (AT)

(73) Assignee: Diem GmbH, Graz (AT)

( * ) Notice: Subject to any disclaimer, the term of this patent is extended or adjusted under 35 U.S.C. 154(b) by 0 days.

(21) Appl. No.: 18/636,743

(22) Filed: Apr. 16, 2024

(51) Int. Cl.
*F21V 15/015* (2006.01)
*F21V 21/005* (2006.01)

(52) U.S. Cl.
CPC .......... *F21V 15/015* (2013.01); *F21V 21/005* (2013.01)

(58) Field of Classification Search
CPC .......................... F21V 15/015; F21V 21/005
See application file for complete search history.

(56) References Cited

U.S. PATENT DOCUMENTS 6,769,784 B2 * 8/2004 Yaphe .................. F21V 15/013 362/225
2004/0114361 A1 * 6/2004 Severtson ............. F21V 15/015 362/225

(Continued)

FOREIGN PATENT DOCUMENTS

AU 2016101574 A4 10/2016
EP 2243997 A1 10/2020
WO WO2024002951 A1 1/2024

OTHER PUBLICATIONS

LS35DI LED/Fluorescent/Light Leak Protection; Amerlux 689-0386, downloaded from https://amerlux.com/Products/Interior/Linear-Systems/Linea Gruv/Linea-3-5-Family/Linear-Systems-(1)/Installation/LIN3-5DI-Installation. Website first archived on www.waybackmachine.org on Mar. 27, 2023 (https://web.archive.org/web/20230331191948/https:/amerlux.com/Products/Interior/Linear-Systems/Linea-Gruv/Linea-3-5-Family).

*Primary Examiner* — Thomas M Sember
(74) *Attorney, Agent, or Firm* — Davidson Kappel LLC

(57) ABSTRACT

A linear luminaire includes a linear channel defining an interior space. The linear channel includes a first linear channel section and a second linear channel section in line with each other. A longitudinal end of the first linear channel section abuts a longitudinal end of the second linear channel section at a junction. Each of the first linear channel section and the second linear channel section includes a channel base wall, a first channel side wall and a second channel side wall. The first channel side wall and the second channel side wall extend away from the base wall and define an interior space therebetween. Free ends of the first and second side walls define an inlet opening of the respective first linear channel section or second linear channel section. The linear luminaire further includes at least one linear light inset including a light source and configured for being inserted into an inserted orientation in the interior spaces of the first linear channel section and the second linear channel section via the inlet openings. The linear luminaire also includes a light leak shield configured for being installed into an installed orientation in the linear channel to block light from the light source from escaping through the junction at a first lateral side of the linear channel, the light leak shield being insertable through the openings of the first linear channel section and the second linear channel section into a first space between the first channel side wall of the first linear channel section and the at least one linear light inset, and between the first channel side wall of the second linear channel section and the at least one linear light inset.

26 Claims, 4 Drawing Sheets

(56) References Cited

U.S. PATENT DOCUMENTS

| | | | | |
|---|---|---|---|---|
| 2017/0051894 | A1* | 2/2017 | Farrell | F21V 17/104 |
| 2017/0051905 | A1* | 2/2017 | Luu | F21V 21/005 |
| 2019/0331322 | A1 | 10/2019 | Parker, II et al. | |

* cited by examiner

LIGHT LEAK SHIELD FOR INSERTING INTO A LINEAR LUMINAIRE INCLUDING A LIGHT INSET INSERTED IN A LINEAR CHANNEL

The present disclosure relates generally to linear luminaires and more specifically to preventing light leaks in linear luminaires including light insets inserted in a channel.

BACKGROUND

Linear luminaires can be mounted directly to a ceiling or wall or can be supported on a pendant, and can include linear light insets inserted in line with each other in a channel including multiple channel segments. Light can leak out of the linear luminaires at gaps between the channel segments.

SUMMARY

A linear luminaire is provided including a linear channel defining an interior space. The linear channel includes a first linear channel section and a second linear channel section in line with each other. A longitudinal end of the first linear channel section abuts a longitudinal end of the second linear channel section at a junction. Each of the first linear channel section and the second linear channel section includes a channel base wall, a first channel side wall and a second channel side wall. The first channel side wall and the second channel side wall extend away from the base wall and define an interior space therebetween. Free ends of the first and second side walls define an inlet opening of the respective the first linear channel section or second linear channel section. The linear luminaire further includes at least one linear light inset including a light source and configured for being inserted into an inserted orientation in the interior spaces of the first linear channel section and the second linear channel section via the inlet openings. The linear luminaire also includes a light leak shield configured for being installed into an installed orientation in the linear channel to block light from the light source from escaping through the junction at a first lateral side of the linear channel, the light leak shield being insertable through the openings of the first linear channel section and the second linear channel section into a first space between the first channel side wall of the first linear channel section and the at least one linear light inset, and between the first channel side wall of the second linear channel section and the at least one linear light inset.

In examples, the light leak shield includes: a base configured to block light from the light source from escaping through the junction at the first lateral side of the linear channel; and at least one arm configured for contacting the at least one linear light inset to hold the base against the first channel side wall.

In examples, the at least one arm is elastic and configured for pressing against the at least one linear light inset to force the base against the first channel side wall.

In examples, the at least one arm includes a first arm and a second arm each being elastic and configured for pressing against the at least one linear light inset to force the base against the first channel side wall.

In examples, the light leak shield is symmetrical with respect to a center plane passing through the base and defining a first direction, the first arm and the second arm being symmetrical with each other relative to the center plane.

In examples, the base includes a first base section intersected by the center plane, the first base section defining a first edge of a first slot surrounding the first arm, the first edge of the first slot extending in the first direction, the first base section defining a first edge of a second slot surrounding the second arm, the first edge of the second slot extending in the first direction.

In examples, the base includes a second base section intersected by the center plane, the second base section defining a second edge of the first slot, the second edge of the first slot extending from the first edge of the first slot away from the center plane, the second base section defining a second edge of the second slot, the second edge of the second slot extending from the first edge of the second slot away from the center plane.

In examples, the second base section defines a lower edge of the base.

In examples, the base includes a third base section intersected by the center plane, the third base section joining a first end of the first arm and a first end of the second arm.

In examples, the third base section defines an upper edge of the base.

In examples, the first base section extends in the first direction from the second base section to the third base section.

In examples, the base includes a fourth base section and a fifth base section, the fourth base section extending in the first direction from the second base section to the third base section, the fourth base section defining a third edge of the first slot, the third edge of the first slot extending in the first direction away from the second edge of the first slot, the fifth base section extending in the first direction from the second base section to the third base section, the fourth base section defining a third edge of the second slot, the third edge of the second slot extending in the first direction away from the second edge of the second slot.

In examples, the second, third, fourth and fifth base sections define an outer perimeter of the base.

In examples, the base is planar and extends in a plane, the at least one arm bent away from the plane at an angle between 10 and 45 degrees.

In examples, the light leak shield is configured such that a thickness of the light leak shield is variable during installation.

In examples, the light leak shield is formed a single sheet of material.

In examples, the single sheet of material is spring steel.

In examples, a longitudinal center plane of the linear channel is between the first channel side wall and the second channel side wall of the first linear channel section and between the first channel side wall and the second channel side wall of the second linear channel section, the at least one linear light inset including a cover and a light assembly fixed to the cover, the light assembly including a support and a light source fixed to the support, the cover including a cover base wall, a first cover side wall and a second cover side wall, the first cover side wall and the second cover side wall extending away from the cover base wall toward the light assembly, the cover base wall, the first cover side wall, the second cover side wall and the light assembly defining an interior space of the at least one linear light inset, the light source configured for emitting light into the interior space and through the base, the first cover side wall defining the first space with the first channel side wall of the first linear channel section and the first channel side wall of the second linear channel section.

In examples, the light leak shield is configured for being compressed between the first cover side wall and the first channel side wall of the first linear channel section, and between the first cover side wall and the first channel side wall of the second linear channel section.

In examples, the first cover side wall includes a first end fixed to the cover base wall and an intermediate section, the at least one linear light inset is configured such that, upon insertion into the linear channel, the intermediate section of the first cover side wall is closer to the longitudinal center plane of the linear channel than the first end of the first cover side wall, the light leak shield configured for pressing against the intermediate section of the first cover side wall in the installed orientation of the light leak shield in the linear channel.

In examples, the light leak shield includes: a base configured to block light from the light source from escaping through the junction at the first lateral side of the linear channel; and at least one arm configured for pressing against the intermediate section of the first cover side wall in the installed orientation of the light leak shield in the linear channel.

In examples, in the inserted orientation of the light leak shield in the linear channel, the intermediate section of the first cover side wall tapers toward the longitudinal center plane of the linear channel while extending away from the first end of the first cover side wall.

In examples, the linear luminaire further includes an additional light leak shield configured for being installed into an installed orientation in the linear channel to block light from the light source from escaping between the second channel side wall of the first linear channel section and the second channel side wall of the second linear channel section through the junction at the first lateral side of the linear channel, the additional light leak shield being insertable through the openings of the first linear channel section and the second linear channel section into a second space between the second channel side wall of the first linear channel section and the at least one linear light inset, and between the second channel side wall of the second linear channel section and the at least one linear light inset.

A light leak shield is also provided for installation in a linear channel between the linear channel and at least one light inset installed in the linear channel. The linear channel includes a first linear channel section and a second linear channel section in line with each other. A longitudinal end of the first linear channel section abuts a longitudinal end of the second linear channel section at a junction at a first lateral side of the linear channel. Each of the first linear channel section and the second linear channel section includes a channel base wall, a first channel side wall and a second channel side wall. The first channel side wall and the second channel side wall extend away from the base wall and define an interior space therebetween. Free ends of the first and second side walls define an inlet opening of the respective first linear channel section or second linear channel section. The light leak shield includes a base configured for being installed into an installed orientation in the linear channel to block light from a light source of the at least one light inset from escaping between the first channel side wall of the first linear channel section and the first channel side wall of the second linear channel section through the junction at the first lateral side of the linear channel. The light leak shield also includes at least one arm configured for pressing against the at least one light inset in the installed orientation of the light leak shield in the linear channel.

A method of manufacturing the light leak shield is also provided. The method includes stamping a metal sheet to cut at least one slot in the metal sheet defining the at least one arm; and bending the at least one arm away from the at least one slot.

A method of installing the light leak shield in the installed orientation is also provided. The method includes forcing an upper edge of the base through a gap. The gap is defined between a lower edge of the first channel side wall and the at least one light inset, and between the lower edge of the second channel side wall and the at least one light inset. The method also includes forcing the at least one arm into the gap to cause the at least one arm to contact the at least one light inset and force a free end of the at least one arm to move toward the base; and forcing the at least one arm past the gap to cause the free end of the at least one arm to move away from the base and into contact with an intermediate section of a side wall of the at least one light inset.

BRIEF DESCRIPTION OF THE DRAWINGS

The present invention is described below by reference to the following drawings, in which.

DETAILED DESCRIPTION

Figure 1A:
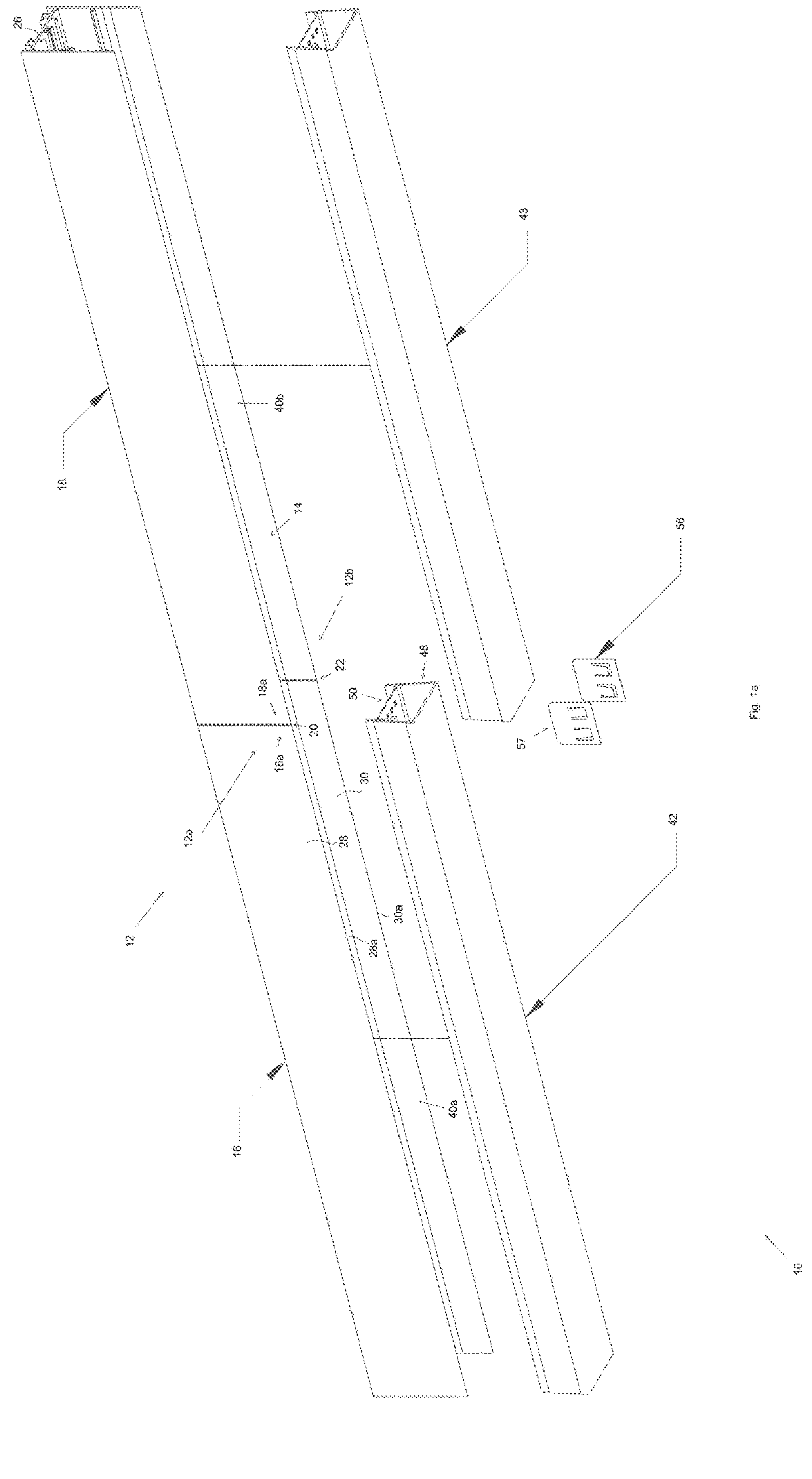
FIG. 1*a* shows a linear luminaire with light insets and light leak shields spaced apart from a linear channel.
Figure 1B:
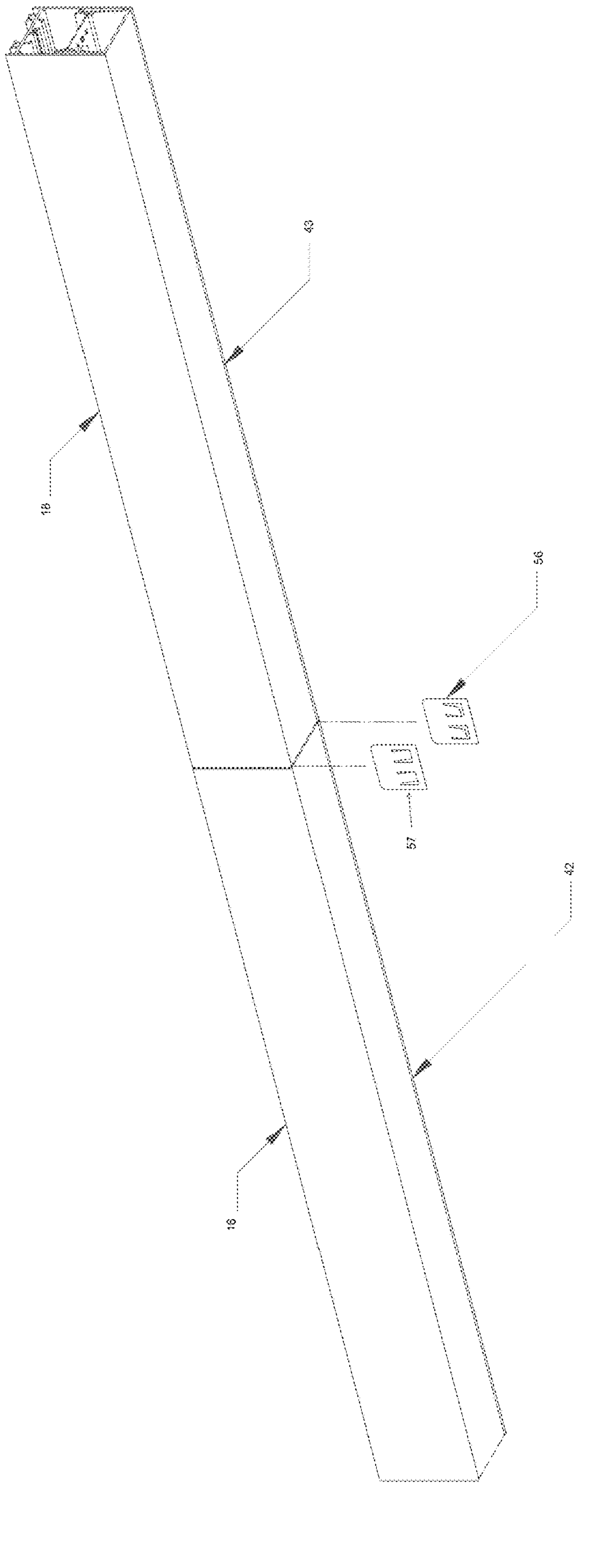
FIG. 1*b* shows the linear luminaire of FIG. 1*a* with light insets in an inserted orientation in the linear channel and the light leak shields spaced apart from the linear channel.

FIGS. 1*a* and 1*b* show a linear luminaire 10 including a linear channel 12 defining an interior space 14. The linear channel 12 includes a first linear channel section 16 and a second linear channel section 18 in line with each other, with a longitudinal end 16*a* of the first linear channel section 16 abutting a longitudinal end 18*a* of the second linear channel section 18 at a junction 20. Each of the first linear channel section 16 and the second linear channel section 18 includes a channel base wall 26, a first channel side wall 28 and a second channel side wall 30. The first channel side wall 28 and the second channel side wall 30 extend away from the base wall 26 and define the interior space 14 therebetween. For each linear channel section 16, 18, a free end 28*a* of the first side wall 28 and a free end 30*a* of the second side wall 30 together define a respective inlet opening 40*a*, 40*b*.

The linear luminaire 10 further includes at least one linear light inset 42, 43. Each light inset 42, 43 includes a light source 44 for emitting light away from the linear channel 12. The at least one light inset 42, 43 is configured for being inserted into an inserted orientation in the interior spaces 14 of the first linear channel section 16 and the second linear channel section 18 via inlet openings 40*a*, 40*b*. In the example shown in FIGS. 1*a*, 1*b*, where two light insets 42, 43 are used, the first linear light inset 42 is configured for being inserted into an inserted orientation in the interior space 14 of the first linear channel section 16 via inlet opening 40*a* formed by the free ends (i.e., lower ends) of the first and second channel side walls 28, 30 of first linear channel section 16; and the second linear light inset 43 is configured for being inserted into an inserted orientation in the interior space 14 of the second linear channel section 18 via inlet opening 40*b* formed by the free ends of the first and second channel side walls 28, 30 of second linear channel section 18. In this example, in the inserted orientations of light insets 42, 43, a longitudinal end 42*a* of the first linear light inset 42 abuts a longitudinal end 43*a* of the second linear light inset 43 at a junction 22 that is aligned with junction 20. Each of the linear light insets 42, 43 includes a cover 48 and a light assembly 50 fixed to the cover 48. The cover 48 includes a cover base wall 51, a first cover side wall 52 and a second cover side wall 54. The first cover side wall 52 and the second cover side wall 54 extend away from the cover base wall 51 toward the light assembly 50.

To prevent light leaks, linear luminaire 10 further includes a first light leak shield 56 configured for being installed into an installed orientation in the linear channel 12 to block light from the light source 44 from escaping through the junction 22 at a first lateral side 12*a* of the linear channel 12. In the example where two where two light insets 42, 43 are used, light leak shield 56 blocks the light from the light sources 44 from escaping through the junction 22 at the first lateral side 12*a* of the linear channel 12. As discussed in further detail below, the light leak shield 56 is insertable through the respective openings 40*a*, 40*b* of the first linear channel section 16 and the second linear channel section 18 into a first space 55 between the first channel side wall 28 of the first linear channel section 16 and the at least one linear light inset 42, and between the first channel side wall 28 of the second linear channel section 18 and the at least one linear light inset 42.

A second light leak shield 57, which is identical to the light leak shield 56, is configured for being installed into an installed orientation in the linear channel 12 to block light from the light source 44 from escaping through the junction 20 at a second lateral side 12*b* of the linear channel 12. In the same manner as light leak shield 56, albeit on the opposite lateral side of linear channel 12, the light leak shield 57 is insertable through the respective openings 40*a*, 40*b* of the first linear channel section 16 and the second linear channel section 18 into a second space 57 between the second channel side wall 30 of the first linear channel section 16 and the at least one linear light inset 42, and between the second channel side wall 30 of the second linear channel section 18 and the at least one linear light inset 42.

The light leak shield 56 includes a base 60 configured to block light from the light source 44 from escaping through the junction 22, and at least one arm 62, 63 configured for contacting the at least one linear light inset 42 to hold the base 60 against the first channel side wall 28 of each of the first linear channel section 16 and the second linear channel section 18. Each of arms 62, 63 is elastic and is configured for pressing against the outer lateral surface 52*a* of first cover side wall 52 of at least one linear light inset 42, 43 to force the base 60 against the first channel side wall 28. In the example shown in FIGS. 1*a*, 1*b*, the first arm 62 presses against the outer lateral surface 52*a* of the first linear light inset 42 and the second arm 63 presses against the outer lateral surface 52*a* of the second linear light inset 43 to force the base 60 against both the inner lateral surface 28*d* of the first linear channel section 16 and the inner lateral surface 28*d* of the second linear channel section 18.

Figure 2:
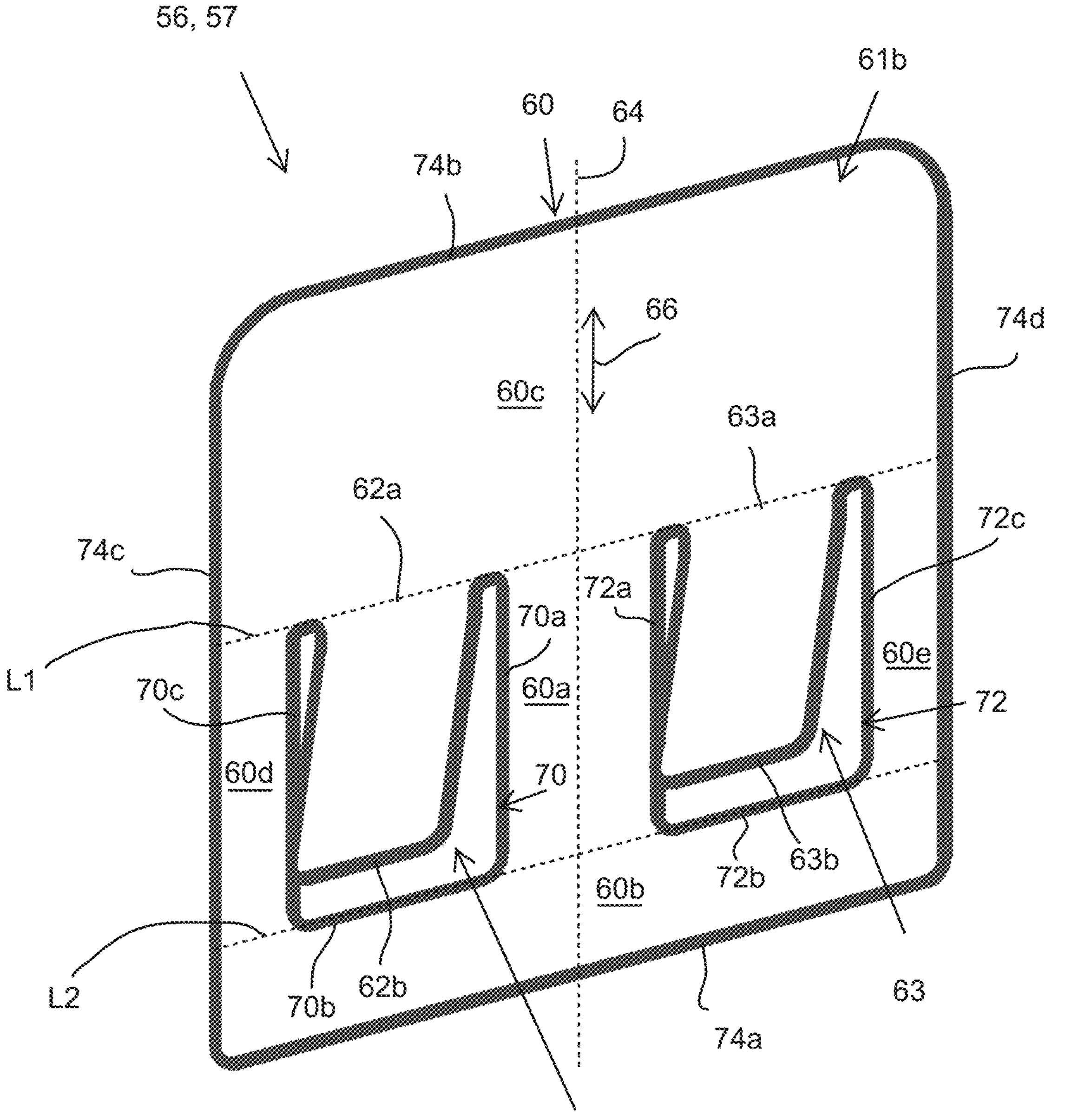
FIG. 2 shows a perspective view of a light leak shield.

As illustrated in FIG. 2, the light leak shield 56 is symmetrical with respect to a center plane 64 that passes through the base 60 and defines a first direction 66. The first arm 62 and the second arm 63 are symmetrical with each other relative to the center plane 64.

The base 60 includes a first base section 60*a* intersected by the center plane 64, and the first base section 60*a* defines a first edge 70*a* of a first slot 70 surrounding the first arm 62. The first base section 60*a* is in the middle of the base 60. The first edge 70*a* of the first slot 70 extends in the first direction 66. The first base section 60*a* also defines a first edge 72*a* of a second slot 72 surrounding the second arm 63. The first edge 72*a* of the second slot 72 extends in the first direction 66. First base section 60*a* is delimited by edges 70*a*, 72*a* and illustrative dotted lines L1, L2.

The base 60 also includes a second base section 60*b* intersected by the center plane 64. The second base section 60*b* defines a second edge 70*b* of the first slot 70. The second edge 70*b* of the first slot 70 extends from the first edge 70*a* of the first slot 70 away from the center plane 64. The second base section 60*b* also defines a second edge 72*b* of the second slot 72. The second edge 72*b* of the second slot 72 extends from the first edge 72*a* of the second slot 72 away from the center plane 64. The second base section 60*b* defines a lower edge 74*a* of the base 60. Second base section 60*a* is delimited by illustrative dotted line L2.

The base 60 further includes a third base section 60*c* intersected by the center plane 64. The third base section 60*c* joins a base end 62*a* of the first arm 62 and a base end 63*a* of the second arm 63. The third base section 60*c* defines an upper edge 74*b* of the base 60. The first base section 60*a* extends in the first direction 66 from the second base section 60*b* to the third base section 60*c*. A base end 62*a*, 63*a* of each of arms 62, 63 is connected to the third base section 60*c* such arms 62, 63 extend downward from third base section 60*c* toward second base section 60*b*. Arms 62, 63 each include a free end 62*b*, 63*b* that is closer to second base section 60*b* than the respective base end 62*a*, 63*a*. Third base section 60*c* is delimited by illustrative dotted line L1.

The base 60 also includes a fourth base section 60*d*, which defines a first side edge 74*c* of base 60 along with sections 60*b*, 60*c*, and a fifth base section 60*e*, which defines a second side edge 74*d* of base 60 along with sections 60*b*, 60*c*. The fourth base section 60*d* extends in the first direction 66 from the second base section 60*b* to the third base section 60*c*. The fourth base section 60*d*, defines a third edge 70*c* of the first slot 70. The third edge 70*c* of the first slot 70 extends in the first direction 66 away from the second edge 70*b* of the first slot 70. Fourth base section 60*d* is delimited by illustrative dotted lines L1, L2 and third edge 70*c*.

The fifth base section 60*e* extends in the first direction 66 from the second base section 60*b* to the third base section 60*c*. The fifth base section 60*e* defines a third edge 72*c* of the second slot 72. The third edge 72*c* of the second slot 72 extends in the first direction 66 away from the second edge 72*b* of the second slot 72. Fifth base section 60*e* is delimited by illustrative dotted lines L1, L2 and third edge 72*c*. The second 60*b*, third 60*c*, fourth 60*d*, and fifth base sections 60*e* define edges 74*a* to 74*d* forming an outer perimeter of the base 60.

A perimeter of the first arm 62 has a same shape as a perimeter of the first slot 70, with the perimeter of the first slot 70 being defined by edges 70*a* to 70*c*. A perimeter of the second arm 62 has a same shape as a perimeter of the second slot 72, with the perimeter of the second slot 72 being defined by edges 72*a* to 72*c*. The base 60 is planar and extends in a plane 76. Base 60 can have a constant thickness. The arms 62, 63 are bent away from the plane 76 at an angle between 5 and 30 degrees. More specifically, base 60 includes a first planar surface 61*a* (FIG. 4*b*) that is configured for contacting the linear channel 12 and a second planar surface 61*b*, opposite of surface 61*a*, that is configured for facing the at least one light inset 42, 43 in the installed orientation of light leak shield 56. Planar surfaces 61*a*, 61*b* are parallel to each other. Planar surface 61*b* faces the arms 62, 63 and planar surface 61*a* faces away from the arms 62, 63.

Figure 3B:
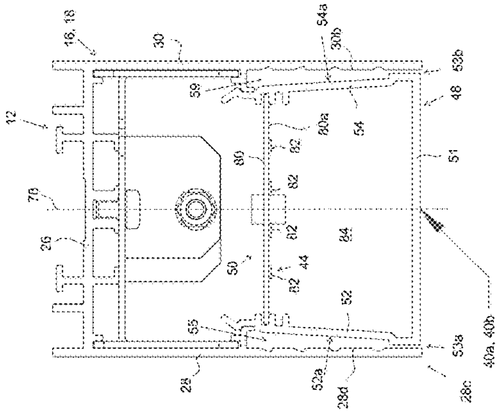
FIG. 3*b* schematically illustrates the ends of first linear channel section and the second linear channel section prior to a light leak shield being installed.
Figure 3A:
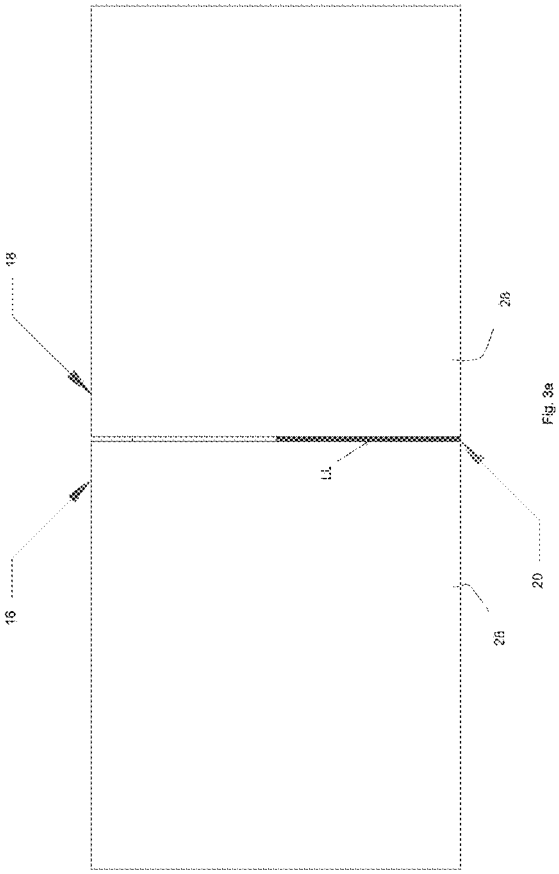
FIG. 3*a* schematically illustrates ends of a first linear channel section and a second linear channel section experiencing a light leak.
Figure 4A:
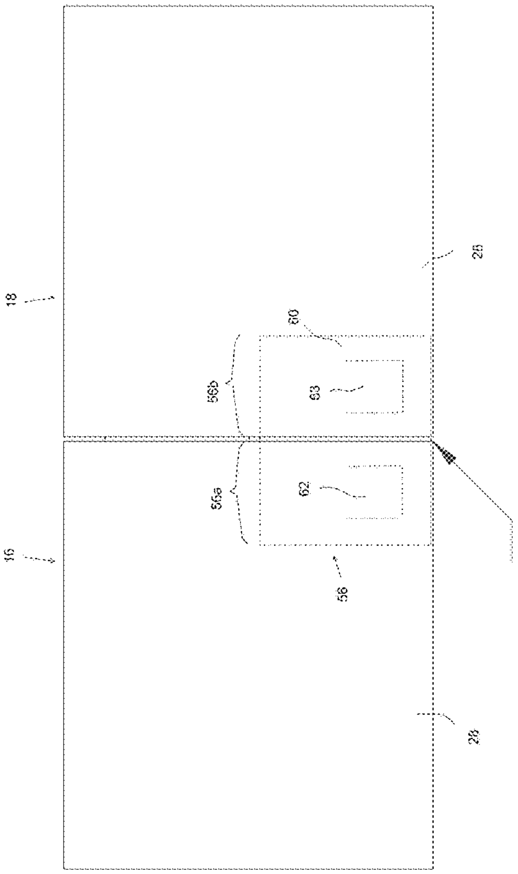
FIG. 4*a* shows the linear luminaire of FIGS. 1*a* and 1*b* with the light inset in an inserted orientation in the linear channel and the light leak shield in an installed orientation in the linear channel.

FIG. 3*a* schematically illustrates ends of first linear channel section 16 and the second linear channel section 18 without a light leak shield 56 installed at junction 20, showing a light leak LL escaping through junction 20 between the first channel side wall 28 of first linear channel section 16 and the first channel side wall 28 of the second linear channel section 18.

Figure 4B:
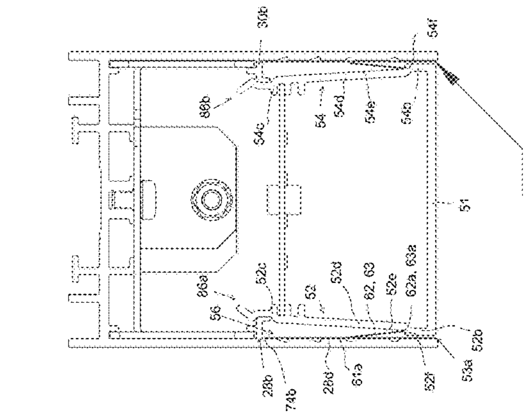
FIG. 4*b* shows the linear luminaire of FIGS. 1*a* and 1*b* with the light inset in an inserted orientation in the linear channel and the light leak shield in an installed orientation in the linear channel.

FIG. 3*b* schematically illustrates ends of first linear channel section 16 and the second linear channel section 18 prior to a light leak shield 56 being installed at junction 20. FIG. 4*b* schematically illustrates ends of first linear channel section 16 and the second linear channel section 18 with a light leak shield 56 installed at junction 20, preventing a light leak LL from escaping through junction 20 between the first channel side wall 28 of first linear channel section 16 and the first channel side wall 28 of the second linear channel section 18. Upon installation into the installed orientation, a first portion 56*a* (e.g., ~90 to 99% of the left side half of light leak shield 56) of light leak shield 56 overlaps with and contacts a portion of an outer lateral surface 52*a* (FIG. 3*b*) of first cover side wall 52 (FIG. 3*b*) of the first linear light inset 42, and overlaps with and contacts a portion of an inner lateral surface 28*d* (FIG. 3*b*) of the first channel side wall 28 of the first linear channel section 16. Similarly, a second portion 56*b* (e.g., ~90 to 99% of the right side half of light leak shield 56 in the view shown in FIGS. 1*a*, 1*b*) of light leak shield 56 overlaps with and contacts a portion of an outer lateral surface 52*a* of first cover side wall 52 of the second linear light inset 43, and overlaps with and contacts a portion of an inner lateral surface 28*d* of the first channel side wall 28 of the second linear channel section 18.

As illustrated in FIGS. 3*b*, 4*b*, a longitudinal center plane 78 of the linear channel 12 is between the first channel side wall 28 and the second channel side wall 30 of the first linear channel section 16 and between the first channel side wall 28 and the second channel side wall 30 of the second linear channel section 18. The light assembly 50 includes a support 80 and a light source 44 fixed to the support 80. The support 80 can be a printed circuit board and the light source 44 can be a plurality of LEDs 82. The cover base wall 51, the first cover side wall 52, the second cover side wall 54 and the light assembly 50 define an interior space 84 of the respective linear light inset 42, 43. The light source 44 is configured for emitting light into the interior space 84 and through the base wall 51. The outer lateral surface 52*a* of first cover side wall 52 defines the first space 55 with the inner lateral surfaces 28*a* of the first channel side walls 28 of the first and second linear channel sections 16, 18.

The light leak shield 56 is configured for being compressed between the first cover side wall 52 and the first channel side wall 28 of the first linear channel section 16, and between the first cover side wall 52 and the first channel side wall 28 of the second linear channel section 18. More specifically, each arm 62, 63 is formed as a flat spring, with the first arm 62 being configured for being compressed between the first cover side wall 52 and the first channel side wall 28 of the first linear channel section 16, and the second arm 63 being configured for being compressed between the first cover side wall 52 and the first channel side wall 28 of the second linear channel section 18. The compression of the arms 62, 63 forces the first planar surface 61*a* to contact inner lateral surface 28*d* of linear channel sections 16, 18 in the installed orientation. The first planar surface 61*a* can rest flush against the inner lateral surface 28*d* of linear channel sections 16, 18 in the installed orientation.

The first cover side wall 52 includes a lower end section 52*b* fixed to the cover base wall 51, an upper end section 52*c* connected to the light assembly 50 and an intermediate section 52*d* between the end sections 52*b*, 52*c*. The linear light insets 42, 43 are configured such that, in the inserted orientation of light insets 42, 43 into the linear channel 12, an outwardly facing surface 52*e* of the intermediate section 52*d* is closer to the longitudinal center plane 78 of the linear channel 12 than an outwardly facing surface 52*e* of the lower end section 52*b*. The outwardly facing surface 52*e* of the lower end section 52*b* is closer to the inner lateral surface 28*d* than the outwardly facing surface 52*e* of the intermediate section 52*d*. The outwardly facing surface 52*e* is separated from the inner lateral surface 28*d* by a gap 53*a* that is between 0.3 mm and 2 mm. This gap 53*a* can vary based on the ambient temperature, as light insets 42, 43 can be formed of plastic that expands with an increase in temperature, and contracts with a decrease in temperature. The light leak shield 56 can ensure that light leaks are prevented even in low temperatures when the plastic contracts.

The light leak shield 56 is configured for pressing against the outwardly facing surface 52*e* of the intermediate section 52*d* of the first cover side wall 52 in the installed orientation of the light leak shield 56 in the linear channel 12. More specifically, arms 62, 63 are configured for pressing against the outwardly facing surface 52*e* of the at least one light inset 42, 43. The first arm 62 can press against the outwardly facing surface 52*e* of the first light inset 42, and the second arm 63 can press against the outwardly facing surface 52*e* of the second light inset 43.

In the inserted orientation of the light leak shield 56 in the linear channel 12, the intermediate section 52*d* tapers toward the longitudinal center plane 78 of the linear channel 12 while extending away from the lower end section 52*b* of the first cover side wall 52. A support surface 52*f* is formed at the intersection between the lower end section 52*b* and the intermediate section 52*d*. Support surface 52*f* extends inward from lower end section 52*b* toward the interior space 84. In the installed orientation of light leak shield 56, free ends 62*b*, 63*b* of arms 62, 63 can rest on top of one or more support surfaces 52*f*. In the example with two light insets 42, 43, the free end 62*b* can rest on top of the support surface 52*f* of the first light inset 42 and the free end 63*b* can rest on top of the support surface 52*f* of the second light inset 43.

In the same manner as the first cover side wall 52, the second cover side wall 54 includes a lower end section 54*b* fixed to the cover base wall 51, an upper end section 54*c* connected to the light assembly 50 and an intermediate section 54*d* between the end sections 54*b*, 54*c*. The linear light insets 42, 43 are configured such that, in the inserted insertion of light insets 42, 43 into the linear channel 12, an outwardly facing surface 54*e* of the intermediate section 54*d* is closer to the longitudinal center plane 78 of the linear channel 12 than an outwardly facing surface 54*e* of the lower end section 54*b*. The outwardly facing surface 54*e* of the lower end section 54*b* is closer to the inner lateral surface 30*b* than the outwardly facing surface 54*e* of the intermediate section 54*d*. The outwardly facing surface 54*e* is separated from an inner lateral surface 30*b* of second channel side wall 30 by a gap 53*b* that is between 0.3 mm and 2 mm. Accordingly, first end sections 52*b*, 54*b* together form a portion of each light insets 42, 43 that is laterally wider than intermediate sections 52*d*, 54*d* and outwardly facing surfaces 52*e*, 54*e* taper inwardly while extending toward the light source 44.

In the same manner as light leak shield 56, the light leak shield 57 is configured for pressing against the outwardly facing surface 54*e* of the intermediate section 54*d* of the first cover side wall 54 in the installed orientation of the light leak shield 57 in the linear channel 12. More specifically, arms 62, 63 are configured for pressing against the outwardly facing surface 54*e* of the at least one light inset 42, 43. The first arm 62 can press against the outwardly facing surface 54*e* of the first light inset 42, and the second arm 63 can press against the outwardly facing surface 54*e* of the second light inset 43.

In the same manner as first cover side wall 52, a support surface 54*f* is formed at the intersection between the lower end section 54*b* and the intermediate section 54*d*. Support surface 54*f* extends inward from lower end section 54*b* toward the interior space 84. In the installed orientation of light leak shield 57, free ends 62*b*, 63*b* of arms 62, 63 can rest on top of one or more support surfaces 54*f*. In the example with two light insets 42, 43, the free end 62*b* can rest on top of the support surface 54*f* of the first light inset 42 and the free end 63*b* can rest on top of the support surface 54*f* of the second light inset 43.

In the same manner as first cover side wall 52, in the inserted orientation of the light leak shield 57 in the linear channel 12, the intermediate section 54*d* tapers toward the longitudinal center plane 78 of the linear channel 12 while extending away from the lower end section 54*b* of the first cover side wall 54.

Cover base wall 51 forms a translucent portion of cover 48, and LEDs 82 are arranged for emitting light through cover base wall 51. Cover 48 also includes two cover connectors 86*a*, 86*b*, and each of cover connectors 86*a*, 86*b* is fixed to a respective one of the two channel side walls 28, 30. Cover connectors 86*a*, 86*b* are configured for being snapped into the channel 12 to hold the cover 48 in the space 14 between the two channel side walls 28, 30. The connection by connectors 86*a*, 86*b* to channel 12 prevents light insets 42, 43 from falling downward from channel 12 through an opening 88 defined at lower ends of channel side walls 28, 30.

Cover connectors 86*a*, 86*b* are positioned above an upward facing side 80*a* of support 80—i.e., the side facing channel base wall 26, which is opposite a downward facing side 80*b* of support 80—i.e., the side facing cover base wall 51. LEDs 82 are fixed to downward facing side 80*b* of support 80. Each of cover connectors 86*a*, 86*b* is formed integrally as a single piece with an end of the respective cover side wall 52, 54. Further, cover side walls 52, 54 are formed integrally as a single piece with cover base wall 51. In other words, cover base wall 51, cover side walls 52, 54 and cover connectors 86*a*, 86*b* are formed integrally as a single piece to constitute cover 48. In one advantageous example, cover 48 may be formed of plastic and may have an opal color such that it is translucent, but not transparent. In other examples, cover 48 may be translucent and transparent or cover 48 may be translucent and colored.

Each of the two channel side walls 28, 30 includes a channel connector 28*b*, 30*b*. Each of cover connectors 86*a*, 86*b* is configured for being snapped onto one of the channel connectors 28*b*, 30*b* by pressing light insets 42, 43 upward into the linear channel 12 to create a form fit connection between the channel 12 and the cover 48.

The light leak shields 56, 57 can each be formed from a single sheet of material. The material can be a metal. In one preferred embodiment, the metal is a spring steel. A method of manufacturing the light leak shields 56, 57 can include stamping a metal sheet to cut the slots 70, 72 in the metal sheet so the slots 70, 72 define arms 62, 63, and then bending the arms 62, 63 away from the slots 70, 72.

A method for installing linear luminaire 10 includes fixing first linear channel section 16 and the second linear channel section 18 of linear channel 12 to a support structure, e.g., a ceiling, and inserting linear light insets 42, 43 into channel 12 in space 14 between the two channel side walls 28, 30 and connecting the linear light insets 42, 43 to the respective channel section 16, 18 in the space 14 by cover connectors 86*a*, 86*b* of the linear light insets 42, 43. The inserting of linear light insets 42, 43 includes pressing the inset 42 into the opening 88 defined at lower ends of channel side walls 28, 30 of first linear channel section 16 and pressing the inset 43 into the opening 88 defined at lower ends of channel side walls 28, 30 of the second linear channel section 18. Connectors 86*a*, 86*b* are forced into respective channel connectors 28*b*, 30*b* to create form fit connection between connectors 86*a*, 86*b* and the respective channel connectors 28*b*, 30*b*. After this connection, light inset 42 is in an inserted orientation in first linear channel section 16 and light inset 43 is in an inserted orientation in second linear channel section 18.

After light insets 42, 43 are in the inserted orientations in linear channel 12, the light leak shields 56, 57 can be installed into the installed orientation in linear channel 12. The method of installing light leak shield 56 can include, by moving the light leak shield 56 upward into linear channel 12, forcing the upper edge 74*b* of the base 60 through the gap 53*a* defined between a lower end 28*c* of the first channel side wall 28 of first linear channel section 16 and the at least one light inset 42, 43, and between a lower end 28*c* of the first channel side wall 28 of the second linear channel section 18 and the at least one light inset 42, 43. The method can next include, while continuing to move the light leak shield 56 upward into linear channel 12, forcing the at least one arm 62, 63 into the gap 53*a*-base end 62*a*, 63*a* first-to cause the at least one arm 62, 63 to contact the at least one light inset 42, 43 at lower end section 52*b*, and force the free end 62*b*, 63*b* of the at least one arm 62, 63 to move toward the base 60 and into the at least one slot 70, 72. The method can then include, while continuing to move the light leak shield 56 upward into linear channel 12, forcing the at least one arm 62, 63 past the gap 53*a* to cause the free end 62*b*, 63*b* of the at least one arm 62, 63 to move away from the base 60 and into contact with the intermediate section 52*d* of the side wall 52. Free end 62*b*, 63*b* is caused to move away from base 60 by freeing the at least one arm 62, 63 of the compressive force applied by first cover side wall 52 by moving free end 62*b*, 63*b* upward past support surface 52*f* so that the at least one arm 62, 63 expands. After such expansion, free end 62*b*, 63*b* can be caused to rest on top of support surface 52*f*, while free end 62*b*, 63*b* presses into first cover side wall 52 at outwardly facing surface 52*e* of intermediate section 52*d*. The pressing into outwardly facing surface 52*e* presses first planar surface 61*a* into inner lateral surface 28*d* of first channel side wall 28 of first linear channel section 16 and inner lateral surface 28*d* of first channel side wall 28 of the second linear channel section 18. Light leak shield 57 is installed in the same manner.

Light leak shield 56 is configured such that a thickness of light leak shield 56 is variable during installation. The thickness is measured by the distance between free end 62*b* of arm 62 and first planar surface 61*a*. When free end 62*b* is in the gap 53*a*, light leak shield 56 has a minimum thickness. When free end 62*b* has not yet entered into gap 53*a*, light leak shield 56 has a maximum thickness. When light leak shield 56 is in the installed orientation and free end 62*b* contacts outwardly facing surface 52*e*, light leak shield 56 has an installed thickness that is greater than the minimum thickness and less that the maximum thickness.

In the installation orientation of light leak shield 56, the upper edge 74*b* is positioned above the light source 44 and the lower edge 74*a* is positioned in the gap 53*a*.

The preceding specification refers to specific exemplary embodiments and examples. It will, however, be evident that various modifications and changes may be made thereto without departing from the broader spirit and scope as set forth in the claims that follow. The specification and drawings are accordingly to be regarded in an illustrative manner rather than a restrictive sense.

What is claimed is:

1. A linear luminaire comprising:

a linear channel defining an interior space, the linear channel including a first linear channel section and a second linear channel section in line with each other, a longitudinal end of the first linear channel section abutting a longitudinal end of the second linear channel section at a junction, each of the first linear channel section and the second linear channel section including a channel base wall, a first channel side wall and a second channel side wall, the first channel side wall and the second channel side wall extending away from the base wall and defining an interior space therebetween, free ends of the first and second side walls defining an inlet opening of the respective first linear channel section or second linear channel section, at least one linear light inset including a light source and configured for being inserted into an inserted orientation in the interior spaces of the first linear channel section and the second linear channel section via the inlet openings; and a light leak shield configured for being installed into an installed orientation in the linear channel to block light from the light source from escaping through the junction at a first lateral side of the linear channel, the light leak shield being insertable through the openings of the first linear channel section and the second linear channel section into a first space between the first channel side wall of the first linear channel section and the at least one linear light inset, and between the first channel side wall of the second linear channel section and the at least one linear light inset.

2. The linear luminaire as recited in claim 1, wherein the light leak shield includes:

a base configured to block light from the light source from escaping through the junction at the first lateral side of the linear channel; and at least one arm configured for contacting the at least one linear light inset to hold the base against the first channel side wall.

3. The linear luminaire as recited in claim 2, wherein the at least one arm is elastic and configured for pressing against the at least one linear light inset to force the base against the first channel side wall.

4. The linear luminaire as recited in claim 3, wherein the at least one arm includes a first arm and a second arm each being elastic and configured for pressing against the at least one linear light inset to force the base against the first channel side wall.

5. The linear luminaire as recited in claim 4, wherein the light leak shield is symmetrical with respect to a center plane passing through the base and defining a first direction, the first arm and the second arm being symmetrical with each other relative to the center plane.

6. The linear luminaire as recited in claim 5, wherein the base includes a first base section intersected by the center plane, the first base section defining a first edge of a first slot surrounding the first arm, the first edge of the first slot extending in the first direction, the first base section defining a first edge of a second slot surrounding the second arm, the first edge of the second slot extending in the first direction.

7. The linear luminaire as recited in claim 6, wherein the base includes a second base section intersected by the center plane, the second base section defining a second edge of the first slot, the second edge of the first slot extending from the first edge of the first slot away from the center plane, the second base section defining a second edge of the second slot, the second edge of the second slot extending from the first edge of the second slot away from the center plane.

8. The linear luminaire as recited in claim 7, wherein the second base section defines a lower edge of the base.

9. The linear luminaire as recited in claim 7, wherein the base includes a third base section intersected by the center plane, the third base section joining a first end of the first arm and a first end of the second arm.

10. The linear luminaire as recited in claim 9, wherein the third base section defines an upper edge of the base.

11. The linear luminaire as recited in claim 9, wherein the first base section extends in the first direction from the second base section to the third base section.

12. The linear luminaire as recited in claim 10, wherein the base includes a fourth base section and a fifth base section, the fourth base section extending in the first direction from the second base section to the third base section, the fourth base section defining a third edge of the first slot, the third edge of the first slot extending in the first direction away from the second edge of the first slot, the fifth base section extending in the first direction from the second base section to the third base section, the fourth base section defining a third edge of the second slot, the third edge of the second slot extending in the first direction away from the second edge of the second slot.

13. The linear luminaire as recited in claim 12, wherein the second, third, fourth and fifth base sections define an outer perimeter of the base.

14. The linear luminaire as recited in claim 2, wherein the base is planar and extends in a plane, the at least one arm bent away from the plane at an angle between 10 and 45 degrees.

15. The linear luminaire as recited in claim 1, wherein the light leak shield is configured such that a thickness of the light leak shield is variable during installation.

16. The linear luminaire as recited in claim 1, wherein the light leak shield is formed a single sheet of material.

17. The linear luminaire as recited in claim 16, wherein the single sheet of material is spring steel.

18. The linear luminaire as recited in claim 1, wherein a longitudinal center plane of the linear channel is between the first channel side wall and the second channel side wall of the first linear channel section and between the first channel side wall and the second channel side wall of the second linear channel section, the at least one linear light inset including a cover and a light assembly fixed to the cover, the light assembly including a support and a light source fixed to the support, the cover including a cover base wall, a first cover side wall and a second cover side wall, the first cover side wall and the second cover side wall extending away from the cover base wall toward the light assembly, the cover base wall, the first cover side wall, the second cover side wall and the light assembly defining an interior space of the at least one linear light inset, the light source configured for emitting light into the interior space and through the base, the first cover side wall defining the first space with the first channel side wall of the first linear channel section and the first channel side wall of the second linear channel section.

19. The linear luminaire as recited in claim 18, wherein the light leak shield is configured for being compressed between the first cover side wall and the first channel side wall of the first linear channel section, and between the first cover side wall and the first channel side wall of the second linear channel section.

20. The linear luminaire as recited in claim 18, wherein the first cover side wall includes a first end fixed to the cover base wall and an intermediate section, the at least one linear light inset is configured such that, upon insertion into the linear channel, the intermediate section of the first cover side wall is closer to the longitudinal center plane of the linear channel than the first end of the first cover side wall, the light leak shield configured for pressing against the intermediate section of the first cover side wall in the installed orientation of the light leak shield in the linear channel.

21. The linear luminaire as recited in claim 20, wherein the light leak shield includes:

a base configured to block light from the light source from escaping through the junction at the first lateral side of the linear channel; and at least one arm configured for pressing against the intermediate section of the first cover side wall in the installed orientation of the light leak shield in the linear channel.

22. The linear luminaire as recited in claim 20, wherein in the inserted orientation of the light leak shield in the linear channel, the intermediate section of the first cover side wall tapers toward the longitudinal center plane of the linear channel while extending away from the first end of the first cover side wall.

23. The linear luminaire as recited in claim 1, further comprising an additional light leak shield configured for being installed into an installed orientation in the linear channel to block light from the light source from escaping between the second channel side wall of the first linear channel section and the second channel side wall of the second linear channel section through the junction at the first lateral side of the linear channel, the additional light leak shield being insertable through the openings of the first linear channel section and the second linear channel section into a second space between the second channel side wall of the first linear channel section and the at least one linear light inset, and between the second channel side wall of the second linear channel section and the at least one linear light inset.

24. A light leak shield for installation in a linear channel between the linear channel and at least one light inset installed in the linear channel, the linear channel including a first linear channel section and a second linear channel section in line with each other, a longitudinal end of the first linear channel section abutting a longitudinal end of the second linear channel section at a junction at a first lateral side of the linear channel, each of the first linear channel section and the second linear channel section a channel base wall, a first channel side wall and a second channel side wall, the first channel side wall and the second channel side wall extending away from the base wall and defining an interior space therebetween, free ends of the first and second side walls defining and inlet opening of the respective first linear channel section or second linear channel section, the light leak shield comprising:

a base configured for being installed into an installed orientation in the linear channel to block light from a light source of the at least one light inset from escaping between the first channel side wall of the first linear channel section and the first channel side wall of the second linear channel section through the junction at the first lateral side of the linear channel; and at least one arm configured for pressing against the at least one light inset in the installed orientation of the light leak shield in the linear channel.

25. A method of manufacturing the light leak shield as recited in claim 24, the method comprising:

stamping a metal sheet to cut at least one slot in the metal sheet defining the at least one arm; and bending the at least one arm away from the at least one slot.

26. A method of installing the light leak shield as recited in claim 24 in the installed orientation, the method comprising:

forcing an upper edge of the base through a gap, the gap being defined between a lower edge of the first channel side wall and the at least one light inset and between the lower edge of the second channel side wall and the at least one light inset;

forcing the at least one arm into the gap to cause the at least one arm to contact the at least one light inset and force a free end of the at least one arm to move toward the base; and forcing the at least one arm past the gap to cause the free end of the at least one arm to move away from the base and into contact with an intermediate section of a side wall of the at least one light inset.

* * * * *